UNITED STATES PATENT OFFICE.

LOUISE JEANMAIRE, OF ROCKFORD, ILLINOIS.

INDELIBLE INK.

1,289,793.  Specification of Letters Patent.  Patented Dec. 31, 1918.

No Drawing.  Application filed June 8, 1918.  Serial No. 238,922.

*To all whom it may concern:*

Be it known that I, LOUISE JEANMAIRE, a citizen of the United States, residing at Rockford, in the county of Winnebago and State of Illinois, have invented new and useful Improvements in Indelible Ink, of which the following is a specification.

This invention relates to a composition to be used as an ink, the object of the invention being to produce an indelible ink which may be used in connection with a pen for writing or marking on any material or surface, the said ink being indelible so as to form a permanent record.

My improved ink is formed by properly combining the following ingredients, extract of logwood, potassium bichromate, alum, distilled water, nut galls in solution, gum arabic, and nitrate of silver.

In preparing the ink or composition, I prefer to combine the ingredients in the manner hereinafter described and in the proportions stated. I first take four ounces of extract of logwood, ten grains of potassium bichromate, and one-half ounce of alum. The last named ingredients are dissolved in one pint of distilled water, and the resultant liquid is boiled slowly for one hour. Separately from the foregoing, I take sixty drops of nut galls in solution, one ounce of gum arabic, and two and one-half drams of nitrate of silver and dissolve the same together, and then mix the same thoroughly and allow to stand for two weeks. The two solutions thus formed are then combined to produce the improved indelible ink.

In order to fix the ink or render the same permanent I employ first a mordant solution containing one-half ounce of carbonate of soda and four ounces of distilled water.

The ink is especially adapted for writing or stamping upon any kind of paper fabric or material ordinarily used for writing purposes. The mordant is used mainly when writing or stamping on cloth or textile material of any kind. Such cloth or material is treated with the mordant and then allowed to dry; then the ink is used, a quill pen being preferably employed for writing purposes. When the ink dries, it forms an indelible mark or impression.

I claim:—

1. An indelible ink, made of extract of logwood, potassium bichromate, alum, nut galls, gum arabic, nitrate of silver, and water, the same being combined as set forth.

2. An indelible ink, made of four ounces of extract of logwood, ten grains of potassium bichromate, one-half ounce of alum, sixty drops of a solution of nut galls, one ounce of gum arabic, two and one-half drams of nitrate of silver, and one pint of water, combined as set forth, the first three ingredients being dissolved in the water, and the last three ingredients being dissolved together and then combined with the first three ingredients after said first three ingredients have been dissolved in water.

In testimony whereof I affix my signature.

LOUISE JEANMAIRE.

Copies of this patent may be obtained for five cents each, by addressing the "Commissioner of Patents, Washington, D. C."